(12) United States Patent
Yonemoto et al.

(10) Patent No.: US 9,568,003 B2
(45) Date of Patent: Feb. 14, 2017

(54) SCREW COMPRESSOR AND CHILLER UNIT PROVIDED WITH SAME

(71) Applicant: Johnson Controls-Hitachi Air Conditioning Technology (Hong Kong) Limited, Kowloon Bay KI.N (HK)

(72) Inventors: Ryuichiro Yonemoto, Tokyo (JP); Yasuaki Iizuka, Tokyo (JP); Eisuke Kato, Tokyo (JP); Shu Kuriyama, Tokyo (JP); Masahiro Takebayashi, Tokyo (JP)

(73) Assignee: Johnson Controls-Hitachi Air Conditioning Technology (Hong Kong) Limited, Kowloon Bay (HK)

( * ) Notice: Subject to any disclaimer, the term of this patent is extended or adjusted under 35 U.S.C. 154(b) by 0 days.

(21) Appl. No.: 14/422,214

(22) PCT Filed: Jul. 10, 2013

(86) PCT No.: PCT/JP2013/068807
§ 371 (c)(1),
(2) Date: Feb. 18, 2015

(87) PCT Pub. No.: WO2014/045684
PCT Pub. Date: Mar. 27, 2014

(65) Prior Publication Data
US 2015/0226218 A1 Aug. 13, 2015

(30) Foreign Application Priority Data

Sep. 24, 2012 (JP) ................................. 2012-209078

(51) Int. Cl.
*F03C 4/00* (2006.01)
*F04C 2/00* (2006.01)
(Continued)

(52) U.S. Cl.
CPC ............. *F04C 29/026* (2013.01); *F04C 18/08* (2013.01); *F04C 18/16* (2013.01); *F04C 23/008* (2013.01);
(Continued)

(58) Field of Classification Search
CPC ......... F04C 18/08; F04C 18/16; F04C 23/008; F04C 29/02; F04C 29/026; B01D 45/12; B01D 45/08; B01D 46/10; B01D 19/0057
(Continued)

(56) References Cited

U.S. PATENT DOCUMENTS 3,945,216 A * 3/1976 Schibbye ................ F04C 18/16
418/201.1
7,014,437 B2 3/2006 Ohsumimoto et al.
(Continued)

FOREIGN PATENT DOCUMENTS

DE 641877 C * 2/1937 ............. B04C 5/081
JP 58172483 A * 10/1983 ............ F04C 29/026
(Continued)

OTHER PUBLICATIONS

International Search Report dated Oct. 22, 2013 with English translation (four (4) pages).
(Continued)

*Primary Examiner* — Theresa Trieu
(74) *Attorney, Agent, or Firm* — Crowell & Moring LLP

(57) ABSTRACT

A screw compressor is disclosed, which includes a male rotor and a female rotor and an oil separator. The oil separator includes an outer cylinder, an inner cylinder located inside the outer cylinder, and an introducing flow path. An upper end portion of the inner cylinder is held by the oil separator and an outer wall of the inner cylinder is held independently of the inner wall of the outer cylinder. A diameter of an inner wall of the outer cylinder is configured
(Continued)

so that the diameter is gradually reduced along a swirl flow path. Moreover, refrigerant that flowed in swirls and goes down along the swirl flow path. The separated gas refrigerant flows from a lower end portion of the inner cylinder into the inner cylinder and goes up and the separated oil flowing down along the inner wall surface of the outer cylinder.

9 Claims, 5 Drawing Sheets

(51) Int. Cl.
| | |
|---|---|
| F04C 15/00 | (2006.01) |
| F04C 29/02 | (2006.01) |
| F04C 18/16 | (2006.01) |
| F04C 23/00 | (2006.01) |
| F04C 18/08 | (2006.01) |
| F25B 13/00 | (2006.01) |
| B01D 19/00 | (2006.01) |
| B01D 46/10 | (2006.01) |
| B01D 45/12 | (2006.01) |

(52) U.S. Cl.
CPC ............... *F04C 29/02* (2013.01); *F25B 13/00* (2013.01); *B01D 19/0057* (2013.01); *B01D 45/12* (2013.01); *B01D 46/10* (2013.01)

(58) Field of Classification Search
USPC ..... 418/83, 85, 97–100, 201.1, 270, DIG. 1; 55/459.1, 423, 467; 96/209
See application file for complete search history.

(56) References Cited

U.S. PATENT DOCUMENTS

| 8,092,200 B2 | 1/2012 | IiJima et al. |
| 2003/0021714 A1 | 1/2003 | Osumimoto et al. |
| 2009/0071188 A1 | 3/2009 | Kusada et al. |
| 2011/0146215 A1 | 6/2011 | Lee et al. |

FOREIGN PATENT DOCUMENTS

| JP | 4-153596 A | 5/1992 |
| JP | 7-243391 A | 9/1995 |
| JP | 2003-83272 A | 3/2003 |
| JP | 4102891 B2 | 6/2008 |
| JP | 4262472 B2 | 5/2009 |
| JP | 4381458 B2 | 12/2009 |
| JP | 2012-154338 A | 8/2012 |

OTHER PUBLICATIONS

Extended European Search Report issued in counterpart European Application No. 13838450.8 dated Apr. 20, 2016 (seven (7) pages).

\* cited by examiner

SCREW COMPRESSOR AND CHILLER UNIT PROVIDED WITH SAME

TECHNICAL FIELD

The present invention relates to a screw compressor equipped with an oil separator and a chiller unit provided with the screw compressor.

BACKGROUND ART

In general, screw compressors used in refrigeration cycles include: a male rotor (main rotor) and a female rotor (sub rotor) whose rotating shafts are substantially parallel to each other and which are rotated in engagement with each other; a main casing (housing) having a bore for housing the male rotor and the female rotor; a discharge casing (housing wall) that covers the opening of the bore in abutment against the discharge side end face of the main casing in the direction of the rotor shafts; a vertical cylindrical oil separator; and an oil sump for collecting oil separated at the oil separator.

One of the vertical cylindrical oil separators is centrifugal oil separator. In the centrifugal oil separator, oil is caused to adhere to a wall surface by centrifugal force induced by a swirl flow in a separation space. The oil adhering to the wall surface flows down along the wall surface and is collected in an oil sump (sump chamber) provided at the lower part. In general, the centrifugal oil separators are so configured that gas flowing therein is discharged from the upper part of the separation space.

As mentioned above, oil contained in gas discharged from the compression mechanism portion of a compressor is separated and recovered by separating action utilizing centrifugal force. An example of these methods is the cyclone separation disclosed in Patent Literatures 1 and 2. In this conventional example, gas and oil discharged from a compression mechanism portion are guided into a cyclone oil separation space provided at the upper part of an oil tank and separated from each other utilizing centrifugal force.

CITATION LIST

Patent Literature

PTL 1: Japanese Patent No. 4102891
PTL 2: Japanese Patent Application Laid-Open No. 7-243391

SUMMARY OF INVENTION

Technical Problem

However, this conventional technology involves a problem. The oil separator inlet passage is inserted into the space between the outer wall surface of an inner cylinder and the inner wall surface of the oil separator. Therefore, the following flows collide with each other: a flow of gas flowing from an introducing flow path into the oil separation space and a flow swirling in the oil separation space between the outer wall surface of the inner cylinder and the inner wall surface of the oil separator. This collision causes disturbance in the flows and oil sticking to the inner wall surface of the oil separator is let to fly again and the flow velocity is reduced by the collision. As a result, the oil separation efficiency is degraded and oil rate (the amount of oil flowing out of the compressor) is increased.

To avoid the collision of flows to cope with this problem, the flow pass cross-sectional area of the oil separator inlet passage could be reduced. In this case, however, pressure loss at the inlet passage is increased and this degrades the performance. If the flow pass cross-sectional area is increased to reduce pressure loss, the diameter of the oil separator must be increased to avoid the collision of flows. This prevents size reduction of the oil separator.

The oil separation space between the outer wall surface of the inner cylinder and the inner wall surface of the oil separator forms a flow path cross section long in the perpendicular direction. Therefore, a flow of gas discharged from the introducing flow bath into the oil separation space is spread in the vertical direction. For this reason, the swirl flow is decelerated during swirling and the oil separation efficiency is degraded. In addition, since the swirl flow spread in the perpendicular direction collides with the oil surface in the oil sump, the oil rate due to the uneven oil surface or sucking-up of oil is increased. The uneven oil surface makes it difficult to precisely grasp the oil surface position.

To avoid the collision of the spread swirl flow with the oil surface, it is required to increase the height of the oil separator and this makes it difficult to reduce the size of the oil separator.

It is an object of the present invention to provide a screw compressor in which size reduction can be achieved and the oil rate can be reduced and a chiller unit provided with the screw compressor.

Solution to Problem

To solve the problem, a screw compressor of the present invention includes: a male rotor and a female rotor whose rotating shafts are substantially parallel to each other and are rotated in engagement with each other, forming a compression working chamber; and an oil separator into which refrigerant discharged from the compression working chamber flows and separates the refrigerant into refrigerant gas and oil. The oil separator includes: an outer cylinder; an inner cylinder located inside the outer cylinder; and an introducing flow path for letting the refrigerant discharged from the compression working chamber flow in so that the refrigerant swirls toward the circumferential direction on the inner wall surface of the outer cylinder. The upper end portion of the inner cylinder is held by the oil separator and as a result, the outer wall of the inner cylinder is held independently of the inner wall of the outer cylinder. The diameter of the inner wall of the outer cylinder is so configured that the diameter is gradually reduced along the swirl flow path through which the refrigerant flowing in through the introducing flow path swirls. The refrigerant flowing in through the introducing passage swirls and goes down along the swirl flow path which is the inner wall of the outer cylinder. The refrigerant is thereby separated into gas refrigerant and oil. Thereafter, the separated gas refrigerant flows into the inner cylinder from the lower end portion of the inner cylinder and goes up; and the separated oil flows down along the inner wall surface of the outer cylinder.

Advantageous Effects of Invention

According to the present invention, it is possible to provide a screw compressor in which size reduction can be achieved and the oil rate can be reduced and a chiller unit provided with the screw compressor.

DESCRIPTION OF EMBODIMENTS

A screw compressor in an embodiment, including a chiller unit using the screw compressor, has a vertical cylindrical oil separator and an oil sump for collecting oil separated at the oil separator. The screw compressor is used especially in apparatuses, such as air conditioners, chiller units, and refrigerators, including a refrigeration cycle and is so configured that the oil rate of the compressor (the amount of oil discharged out of the compressor) is reduced.

Specifically, the screw compressor in this embodiment includes: a male rotor and a female rotor whose rotating shafts are substantially parallel to each other and which are rotated in engagement with each other, forming a compression working chamber; and an oil separator into which refrigerant discharged from the compression working chamber flows and separates the refrigerant into refrigerant gas and oil. The oil separator includes: an outer cylinder; an inner cylinder located inside the outer cylinder; and an introducing flow path for letting refrigerant discharged from the compression working chamber flow in so that the refrigerant flows toward the circumferential direction on she inner wall surface of the outer cylinder. The upper end portion of the inner cylinder is held by the oil separator and the outer wall of the inner cylinder is thereby held independently of the inner wall of the outer cylinder. The diameter of the inner wall of the outer cylinder is so configured that the diameter is gradually reduced along the swirl flow path through which the refrigerant flowing in through the introducing flow path swirls. The refrigerant flowing in through the introducing passage swirls and goes down along the swirl flow path which is the inner wall of the outer cylinder and the refrigerant is thereby separated into gas refrigerant and oil. Thereafter, the separated gas refrigerant flows from the lower end portion of the inner cylinder into the inner cylinder and goes up; and the separated oil flows down along the inner wall surface of the outer cylinder.

Figure 1:
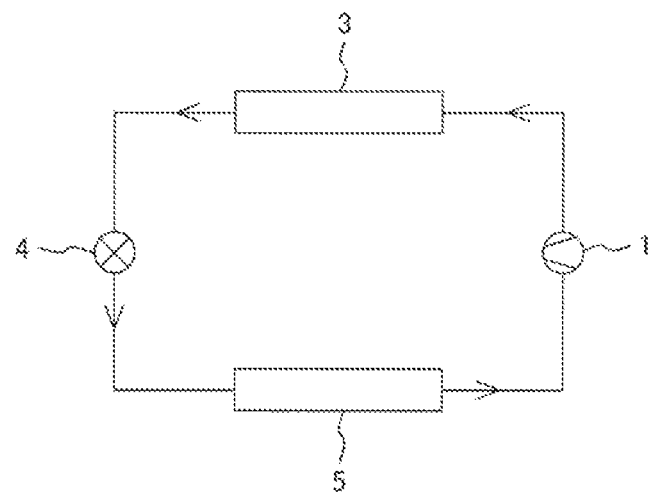
FIG. 1 is a system diagram of a refrigeration cycle.

A description will be given to the screw compressor in this embodiment and a chiller unit using the screw compressor with reference to the drawings. FIG. 1 of a system diagram illustrating a refrigeration cycle (chiller unit) of the present invention. In FIG. 1, the refrigeration cycle is formed by connecting a compressor 1, an oil separator 2, a condenser 3, an expansion valve 4, and an evaporator 5 through a refrigerant pipe in this order and forms a circulation cycle.

Oil supplied for lubricating the bearings and screw rotors in the compressor, if a large quantity thereof enters the refrigeration cycle, produces heat resistance and inhibits heat exchange in the evaporator 5 or the condenser 3.

Further, pressure loss is increased by the viscosity of the oil and the performance of the entire refrigeration cycle is degraded. If a large quantity of oil flows out of the compressor 1 into the refrigeration cycle, the quantity of oil retained in the compressor is reduced. This makes it difficult to ensure a quantity of oil sufficient to lubricate the bearings and screw rotors in the compressor. To cope with this, it is necessary to efficiently separate only oil from refrigerant gas, compressed at the compressor 1, at the oil separator 2.

Figure 2:
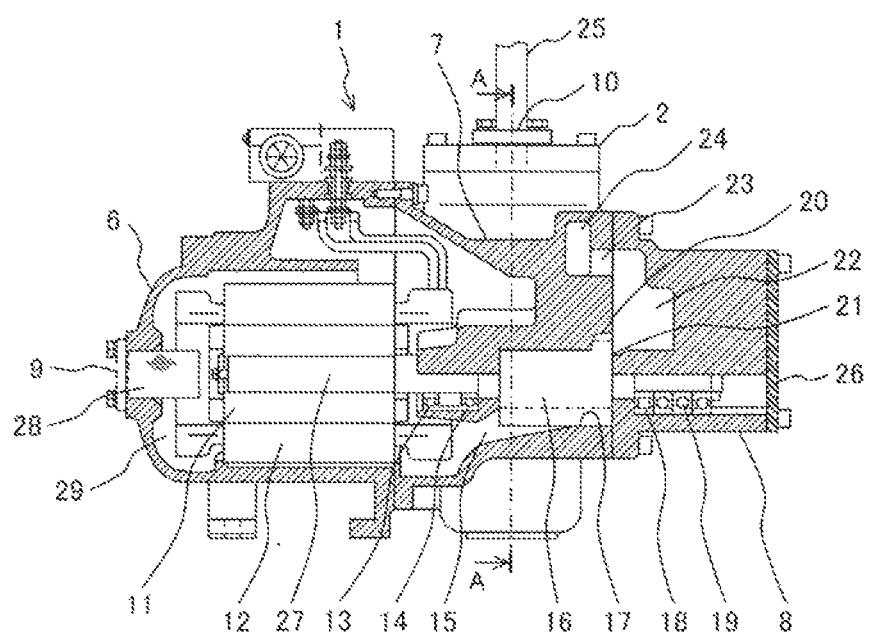
FIG. 2 is a longitudinal sectional view of a screw compressor.

FIG. 2 is a longitudinal sectional view of a screw compressor. In FIG. 2, the screw compressor includes: a compressor body 1; a motor 11 or 12 driving the compressor body 1; and a motor casing 6 housing the motor 11 or 12. The motor casing 6 forms a suction chamber (low pressure chamber) 29 on the anti-compressor body side of the motor 11 or 12. Gas flows from a suction port 9 into the suction chamber 29 through a strainer 28. The motor 11 or 12 is configured of a rotor 11 attached to a rotating shaft 27 and a stator 12 placed on the outer circumferential side of the rotor 11. The stator 11 is secured on the inner surface of the motor casing 6.

The compressor body 1 is connected to the motor casing 6 and includes: a main casing 7 housing therein the male rotor 16 and the female rotor (not shown) whose rotating shafts 27 are parallel to each other and which are rotated in engagement with each other; and a discharge casing 8 connected to the discharge side of the main casing 7.

In the main casing 7, a cylindrical bore 17 is formed for housing the tooth portions of the male rotor 16 and the female rotor and the suction side of the bore 17 in the direction of rotor shafts is opened. In the main casing forming this opening, a suction port 15 is formed and provides a communicating passage that lets suction gas immediately before compression flow to the tooth portions of the male rotor 16 and the female rotor. The discharge side of the bore 17 in the direction of rotor shafts is also opened. In the main casing 7 forming this opening, a discharge port 20 in the radial direction is formed. In addition, in the discharge casing 8, a discharge port 21 in the axial direction is formed and provides a communicating passage that lets compressed refrigerant gas flow to a discharge chamber 22.

The suction side (left side of FIG. 2) of the main casino 7 in the direction of rotor shafts is connected with the motor casing 6. The clearance and the like between the rotor 11 and stator 12 in the motor casing 6 provide a suction passage that makes the suction chamber 29 and the suction port 15 communicate with each other.

As shown in FIG. 2, the suction-side shaft portion of the male rotor 16 is supported in rolling bearings 13 and 14 placed in the main casing 7; and the discharge-side shaft portion of the male rotor 16 is supported in a rolling bearing 18 and a ball bearing 19 placed in the discharge casing 8. The suction-side shaft portion of the female rotor is supported in a rolling bearing (not shown) placed in the main casing 8; and the discharge-side shaft portion of the female rotor is supported in a roller hearing and a ball bearing (not shown) placed in the discharge casing 8. Reference sign 26 denotes an end cover covering the outside end portion of a bearing chamber housing the roller bearing 18 and the ball bearing 19.

The suction-side shaft portion of the male rotor 16 is directly connected with the rotating shaft 27 of the motor 11 or 12 and the male rotor 16 is rotated by driving of the motor 11 or 12. In conjunction therewith, the female rotor is also rotated in engagement with the male rotor 16. Gas compressed at the male rotor 16 and the female rotor flows from the discharge ports 20 and 21 out to the discharge chamber 22 formed in the discharge casing 8. The gas flows from the discharge chamber 22 to a discharge passage 23 provided in the main casing 7 and is sent to the oil separator 2 through the introducing flow path 24 communicating with the discharge passage 23.

Figure 3:
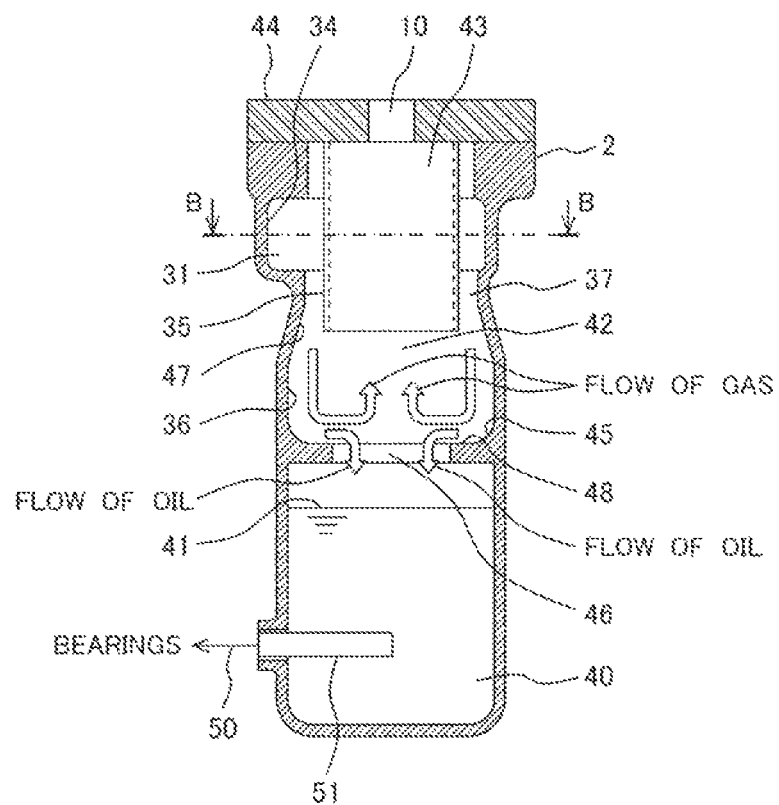
FIG. 3 is a sectional view taken along line A-A of FIG. 2 as viewed in the direction of arrows.
Figure 4:
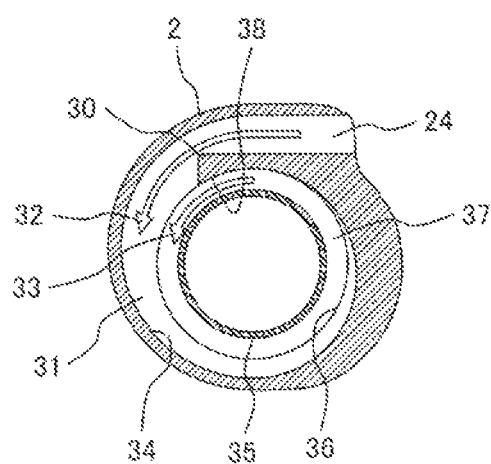
FIG. 4 is a sectional view taken along line B-B of FIG. 3 as viewed in the direction of arrows.

FIG. 3 is a sectional view taken along line A-A of FIG. 2 as viewed in the direction of arrows and FIG. 4 is a sectional view taken along line B-B of FIG. 3 as viewed in the direction of arrows. Each of the drawings is a sectional view explaining the internal configuration of the oil separator in this embodiment. The oil separator 2 formed in the main casing 7 includes: the introducing flow path 24 guiding refrigerant gas into the oil separator; a contraction of pass 30; guides 34, 38 and 48; an oil separator inner wall surface 36; an inclined face 47; a top cover 44; an inner cylinder 35; a sump chamber 40; and a discharge port 10. The cylindrically shaped inner cylinder 35 has a flow path 37 formed between the inner wall surface 36 of the oil separator (outer cylinder) and the outer wall surface of the inner cylinder 35. A swirl flow path 31 in which refrigerant swirls is also formed between the inner wall surface 34 of the guide which is a part of the oil separator (outer cylinder) and the outer wall surface of the inner cylinder 35. The guide 34 is not extended throughout the circumference but is provided so that the guide starts from the contraction of pass 30 at the outlet portion of the introducing flow path and is extended counterclockwise to at least one quarter of the inner cylinder 35. The introducing flow path 24 for gas may be in a clockwise configuration.

The inner wall of the outer cylinder of the oil separator is so formed that the inner wall is widened toward the end. That is, the diameter of the inner wall of the outer cylinder is reduced below the guides 34, 38 and 48 where refrigerant swirls and then gradually increased at the inclined portion (inclined face) going downward. The lower end of the inner cylinder 35 is inserted between the start position and end position of the inclined face 47. The top cover 44 has the inner cylinder 35 secured thereon and is fastened to the upper part of the oil separator and integrated therewith. In the top cover 44, the discharge port 10 for refrigerant gas is formed above the upper part of the inner cylinder 35 of the oil separator 2.

The refrigerant gas swirls along the inclined face 47 of the oil separator 2 and gradually goes down. The gas then swirls along the guide 48 and a curved surface 45 provided at a corner of the inner wall surface 36 on the inner cylinder 35 side and changes the direction of flow to the radial direction. The gas thereafter turns and swirls in an inverting chamber 42 between the lower end of the inner cylinder 35 and the guide portion 48, changing the direction of flow to the upward direction and flows into the inner cylinder 35. The refrigerant gas that flowed into the inner cylinder 35 goes up in a gas outlet flow path 43 and is supplied from the discharge port 10 to the outside (for example, the condenser 3 including the refrigeration cycle) through a pipe (refrigerant pipe) 25.

The oil separated at the oil separator 2 is gradually brought close to the wall surface by a difference in the magnitude of centrifugal force produced by a difference in density from the refrigerant gas. The oil then sticks to the wall surface (the inner wall surface of the outer cylinder) 47 or 36 of the oil separator 2 and the inner wall surface of the guide 34. The stuck oil flows down along the wall surface in the oil separator and is discharged from a circular oil drain hole 46 provided in the center of the guide 48 and collected in the sump chamber 40 formed at the lower part of the oil separator. The oil collected in the sump chamber 40 has the discharge pressure (high pressure) of the compressor body 1 acting thereon; meanwhile, the bearings 13, 14, 18 and 19 are substantially under suction pressure (low pressure). Therefore, the oil goes in an oil pipe 50 connecting the bearings 13, 14, 18 and 19 and the sump chamber 40 through a strainer 51 inserted into the sump chamber 40. The oil is then supplied to the bearings 13, 14, 18 and 19 and the engagement portions of the male and female screw rotors by differential pressure. The oil acts as a lubricant for these elements and a seal between compression chambers and a coolant against heat of compression. The oil is thereafter discharged together with refrigerant gas again and flows into the oil separator 2 and circulates in the compressor.

The thus configured screw compressor acts as described below. After the completion of compression, the refrigerant gas and the oil mixed in the refrigerant gas exit from the discharge ports 20 and 21 as the opening portions of the compression chambers, flow in the introducing flow path 24 by way of the discharge chamber 22, and flow into the oil separator 2. The introducing flow path 24 is connected to the guide 34 in the tangential direction. Therefore, the flow that entered the oil separator 2 swirls counterclockwise along the guide 34 which is a part of the oil separator wall surface and flows into the flow path 37. Since the flow path 37 is connected to the inverting chamber 42, the flow 33 swirls along the oil separator inner wall surface 36 and gradually goes down.

In this embodiment, the diameter of the wall surface of the oil separator 2 (the inner wall of the outer cylinder) is so configured that the following is implemented: the diameter is gradually reduced along the swirl flow path in which the refrigerant that flowed in through the introducing flow path swirls. The refrigerant swirls and goes down along the swirl flow path which is the inner wall of the outer cylinder and is thereby separated into gas refrigerant and oil. Thereafter, the separated gas refrigerant flows from the lower end portion of the inner cylinder into the inner cylinder and goes up; and the separated oil flows down along the inner wall surface of the outer cylinder. Especially, the diameter of the wall surface of the oil separator 2 (the inner wall of the outer cylinder) is so configured that the diameter is gradually reduced along the swirl flow path in which refrigerant swirls. This makes it possible to suppress reduction of the flow velocity of swirling refrigerant and thus high oil separation efficiency can be maintained.

If the outer wall of the inner cylinder is directly connected with the inner wall of the outer cylinder (oil separator 2), swirling of refrigerant would be interfered with by the joint and the flow velocity of the swirling refrigerant would be reduced. In this embodiment, the upper end portion of the inner cylinder is held by the oil separator. As a result, the inner cylinder is held by the oil separator so that the outer wall of the inner cylinder is independent of the inner wan of the outer cylinder. Therefore, a joint connecting the outer wall of the inner cylinder and the inner wall of the outer cylinder (oil separator 2) is not located in the swirl flow path in which refrigerant swirls. This makes it possible to suppress reduction in the flow velocity of swirling refrigerant and thus high oil separation efficiency can be maintained.

With the above-mentioned configuration, when the flow 32 of gas jetting out of the introducing flow path 24 and the flow 33 of swirling gas are prevented from colliding with each other at the inflow from the introducing flow path 24 to the oil separator. If this configuration is not adopted, the flows 32 and 33 of gas would collide with each other and be decelerated and there would be a possibility that the flows are disturbed. In this case, the effect of centrifugal separation is weakened and oil sticking to the wall surface is to let to fly again, and high oil separation efficiency cannot be expected. In this embodiment, to cope with this, a measure is taken so that the following is implemented: the collision of the flow 32 of gas jetting out of the introducing flow path 24 and the flow 33 of swirling gas is prevented at the inflow from the introducing flow path 24 to the oil separator 2. The introducing flow path 24 is provided outside the inner wall surface 36 of the oil separator 2 in the direction of the circumference thereof; and the introducing flow path 24 is connected to the oil separator 2 in the tangential direction. With this configuration, a swirl flow entering from the introducing flow path 24 and the flow 33 of swirling gas are less prone so collide with each other; and the velocities of the gases 32 and 33 can be maintained. This makes it possible to prevent degradation in the effect of centrifugal separation and high oil separation efficiency can be maintained.

If the guide 34 does not exist on she inner wall surface of the oil separator 2 at the inflow from the introducing flow path 24 to the oil separator, the following would take place: the flow 32 of gas jetting out of the introducing flow path 24 is spread in the perpendicular direction immediately after the inflow. As a result, there would be a possibility that the swirl flow going around the inner cylinder 35 is decelerated. In this case, the effect of centrifugal separation is weakened and high oil separation efficiency cannot be expected. In this embodiment, the guide 34 is provided on the inner wall surface of the oil separator 2 and the lower end of the cylindrically shaped inner cylinder is inserted to below the guide. A flow path is thereby formed between the guide and the inner cylinder. Thus the flow 32 of gas entering the guide 34 is blocked by the guide 34 and cannot spread in the perpendicular direction. This makes it possible to suppress reduction in the flow velocity of gas swirling in the guide 34. Since a possibility that the spread flow of gas arrives at the oil surface 41 and disturbs the oil surface 41 is eliminated, the height of the oil separator can be reduced. This makes it possible to prevent degradation in the effect of centrifugal separation and high oil separation efficiency can be expected with a reduced size. When the height of the guide 34 is made equal to the height of the introducing flow path 24 and the guide 34 is so formed that the section of the flow path is in a U shape, higher effect can be obtained.

If the contraction of pass 30 does not exist at the inflow so the swirl flow path 31 of the guide portion, the following would take place: the flow 32 jetting out of the introducing flow path 24 is spread in the horizontal direction immediately after the inflow and the flow jetting out into the guide is decelerated. In this case, the effect of centrifugal separation is weakened and high oil separation efficiency cannot be expected. In this embodiment, the flow 32 of gas jetting out into the oil separator 2 is temporarily accelerated at the portion of the contraction of pass and is less prone to spread in the horizontal direction. This makes it possible to suppress reduction of the flow after jetting out to the oil separator 2 and high oil separation efficiency can be maintained. Therefore, degradation in the effect of centrifugal separation can be prevented and high oil separation efficiency can be maintained. With respect to the contraction of pass 30, the following measure is taken: the contraction of pass 30 as formed the opposite site to the perpendicular face side of the guide 34 of the outlet portion of the introducing flow path 24; and the contraction of pass 30 is so placed that the flow goes along the perpendicular face of the guide 34. As a result, the flow is not detached from the perpendicular face and the production of vortexes between the perpendicular face and the flow 32 can be suppressed; therefore, high oil separation efficiency can be maintained.

If the width of the swirl flow path 31 formed between the perpendicular face of the guide 34 and the outer face of the inner cylinder 35 is not gradually reduced at the inflow to the swirl flow path 31, the following would take place: friction is produced against the wall surface and the swirl flow path 31 is wider as compared with the flow path cross-sectional area of the introducing flow path 24; consequently, the refrigerant gas flowing in the swirl flow path 31 cannot maintain the flow velocity in the introducing flow path 24 and is rapidly decelerated. In this case, the effect of centrifugal separation is weakened and high oil separation efficiency cannot be expected. In this embodiment, as the width of the swirl flow path 31 is gradually reduced to the direction of the flow 32 of gas, the cross-sectional area of she swirl flow path 31 is gradually reduced; therefore, the velocity of the flow 32 of gas can be maintained. In addition, the flow 32 of gas going in the guide gradually swirls and is discharged to the flow path 37. Therefore, the flow velocity of the perpendicular component of gas swirling and flowing in the flow path 37 is constant and thus uneven flow velocity distribution can be prevented. This makes it possible to prevent the oil surface 41 from becoming uneven and oil from flying again. Consequently, the height of the oil separator 2 can be reduced and degradation in the effect of centrifugal separation can be prevented. This makes it possible to maintain high oil separation efficiency with a reduced size. The guide 34 is more effective when the wall surface is formed in an arc shape.

If the guide 38 is not provided for the flow 33 of gas flowing around the inner cylinder 35, the flow 33 of swirling gas would enter the guide again and collide with the flow 32 of gas flowing in the swirl flow path 31. As a result, the flows 32 and 33 of gas would be decelerated and disturbance be produced. The flow of gas that entered the swirl flow path 31 would cause the oil flowing along the wall surface of the guide to fly again. Therefore, the effect of centrifugal separation would be weakened and the oil sticking to the wall surface would fly again. As a result, there would be a possibility that the oil separation efficiency is degraded. In this embodiment, the guide 38 is provided to prevent the flow 33 of swirling gas from entering the guide 34 again. As a result, the swirl flow 23 goes along the outer wall surface of the inner cylinder and thus collision of the flows (32 and 33) of gas can be avoided and flow velocity can be maintained. This makes it possible to prevent degradation in the effect of centrifugal separation and high oil separation efficiency can be maintained. The guide 38 is more effective when an arc as formed along the inner wall surface 36 of the oil separator.

If the velocity of a flow swirling and going down is not reduced at the inflow from the flow path 37 to the inverting chamber 12, there would be a possibility that the following takes place: the flow of refrigerant gas arrives at the oil surface 41 and disturbs the oil surface 41. In this case, oil flies from the oil surface 41 or the oil surface 41 becomes uneven and high oil separation efficiency cannot be expected. If the strainer 51 provided in the sump chamber 40 is exposed from the oil surface by the uneven oil surface 41, the refrigerant gas would flow to the bearings through the strainer 51. As a result, the reliability would be degraded by insufficient lubrication of the bearings. In this embodiment, the inner wall of the outer cylinder of the oil separator is so formed that the inner wall is widened toward the end. That is, the diameter of the inner wall is gradually increased at the inclined portion where the swirling refrigerant goes downward from the swirl flow path. By providing the conical surface (inclined portion) 47 widened toward the oil surface 41 between the flow path 37 and the inverting chamber 42, the space providing a flow path for refrigerant gas is gradually widened; therefore, the flow velocity can be reduced. In addition, provision of the conical surface 47 makes it possible to extend the surface area to which oil contained in swirling refrigerant gas can stick without increasing the height of the oil separator. This makes it possible to prevent the flow of refrigerant gas from arriving at the oil surface 41, maintain high oil separation efficiency, and reduce the height of the oil separator. If the space is abruptly widened to reduce the flow velocity without providing the conical surface (inclined portion) 47, oil flowing down along the wall surface would flow down into the inverting chamber 42. As a result, oil would fly again into the refrigerant gas swirling and flowing down in the inverting chamber 42 and pressure loss be increased in conjunction with the abrupt expansion of the space; therefore, the efficiency of the compressor would be degraded. In this embodiment, the diameter of the inner wall of the outer cylinder is gradually increased at the inclined portion where swirling refrigerant goes downward from the swirl flow path. This makes it possible to let oil flowing down along the wall surface smoothly flow down along the curved surface 47 and suppress increase in pressure loss. Consequently, high oil separation efficiency can be maintained and degradation in the efficiency of the compressor can be prevented.

The guide 48 is provided between the inverting chamber 42 (the lower end portion of the inner cylinder) and the oil surface 41 so that the guide 48 is in accordance with the circumferential surface of the inner wall surface 36 of the oil separator. (The guide 48 is an annular projected member which is extended inward from the entire circumference of the inner wall of the outer cylinder and whose center portion is opened as the oil drain hole 46.) Thus the flow of refrigerant gas swirling and going down flows along the guide 48. This makes it possible to maintain the flow of refrigerant gas swirling and going down and change the flow into a radial flow going toward the center of the oil separator 2. Consequently, the refrigerant gas is less prone to flow into the oil drain hole 46 and this suppresses oil from flying from the oil surface in the sump chamber 40 again and the oil surface from becoming uneven. In addition, the strainer 51 provided at the lower part of the sump chamber 40 is suppressed from being exposed from the oil surface 41 because of the uneven oil surface 41. Even when refrigerant gas enters the suing chamber 40 and disturbs the oil surface 41, the guide 48 acts as a partition. This prevents oil flying again from flowing into the inverting chamber 42 again. Therefore, the flow of refrigerant gas is prevented from arriving at the oil surface 41 and the oil surface 41 is stabilized. This makes it possible to maintain high oil separation efficiency, enhance the reliability of the bearings, and reduce the height of the oil separator.

In this embodiment, the joint between the guide 48 and the inner wall surface 36 of the oil separator is configured of the curved surface 45. As a result, the flow swirling and going down smoothly goes along the curved surface 45 and thus vortexes are less prone to be produced. This makes it possible to smoothly discharge oil flowing down along the wall surface to the oil drain hole 46 and thus high oil separation efficiency can be maintained.

Figure 8:
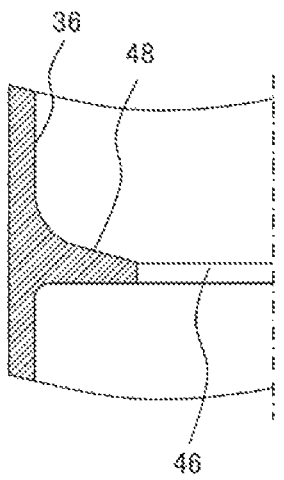
FIG. 8 is a drawing illustrating the shape of a guide tip.

FIG. 8 illustrates the shape of the tip of the guide. As shown in FIG. 8, the inner cylinder-side surface of the guide to which the curved surface 45 is connected may be formed as a conical surface in which a slope is formed toward the oil surface. In this case, oil flowing along the curved surface flows down along the conical surface and thus it is possible to smoothly guide the oil to the oil drain hole 46.

Figure 6:
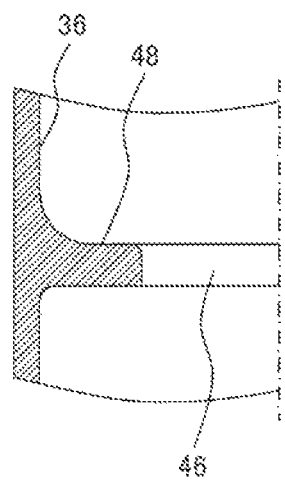
FIG. 6 is a drawing illustrating the shape of a guide tip.
Figure 7:
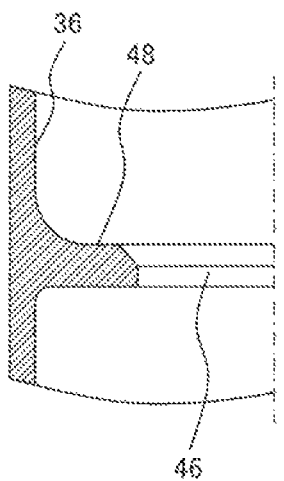
FIG. 7 is a drawing illustrating the shape of a guide tip.

If the tip portion of the guide 48 provided with the oil drain hole 46 is not provided with a curved surface forming an R portion but is formed in an edge shape, the following would take place: at the edged portion, surface tension sufficient to hold oil is prevented from acting on oil flowing along the guide 48 surface. Therefore, there would be a possibility that oil is let to fly again by refrigerant as flowing in proximity to the guide 48 surface and oil separation efficiency is degraded. FIG. 6 illustrates another shape of the tip of the guide. When the tip portion of the guide 48 is provided with a curved surface forming an R portion, as shown in FIG. 6, the following takes place: oil flowing along the guide 48 surface is caused to more firmly stick at the curved surface of the tip portion by surface tension. This prevents oil from being carried away by gas flowing in proximity to the guide 48 and the oil can be let to flow down by gravity. FIG. 7 illustrates another shape of the tip of the guide. The tip portion of the guide 48 need not be the curved surface shown in FIG. 6 and may be, for example, such a conical surface as shown in FIG. 7.

When the circular oil drain hole 46 is provided in the center of the inner wall surface 36 of the oil separator 2 provided with the guide 48, as mentioned above, the following takes place: swirling and flowing refrigerant gas is less prone to enter the sump chamber 40 through the oil drain hole 46. Therefore, the oil surface 41 is not disturbed by the flow of refrigerant gas and thus high oil separation efficiency can be maintained. With this configuration, refrigerant gas is less prone to enter the sump chamber 40.

Figure 5:
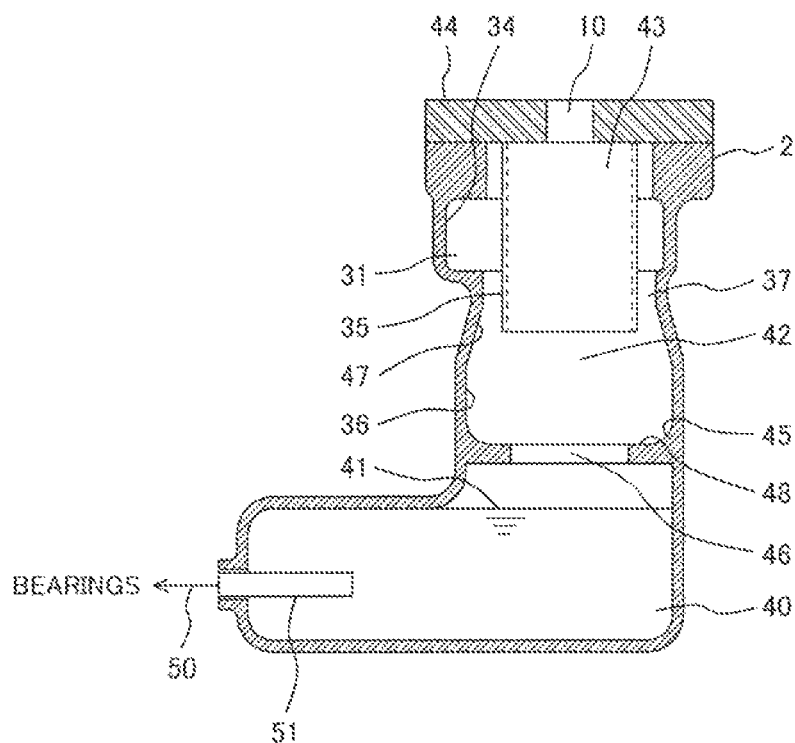
FIG. 5 is a drawing illustrating a sump chamber.

The shape of the sump chamber 40 need not be cylindrical. FIG. 5 illustrates a sump chamber. As shown in FIG. 5, for example, the shape of the sump chamber 40 may be rectangular parallelepiped. This configuration makes it possible to maintain high oil separation efficiency and reduce the height of the oil separator.

When the oil drain hole is formed in a circular shape and the oil separator 2 is formed of a casting, the oil separator can be more easily fabricated by casting or the like.

The discharge port 10 of the oil separator 2 integrated with the compressor 1 is connected as shown in FIG. 1. That is, the discharge port 10 is connected to the suction port 9 of the compressor 1 through the pipe 25 by way of the condenser 3, the expansion valve 4, and the evaporator 5. As a result, the flow of refrigerant gas swirling in the oil separator 2 swirls and goes up in the inverting chamber 42 above the oil drain hole 46. For this reason, when the flow going toward the center of the oil separator 2 in the inverting chamber 42 goes up, gravity acts on the oil contained in the refrigerant gas. As a result, the oil higher in density is separated downward (toward the oil surface 41). Therefore, when the oil drain hole 46 is provided in the center of the guide 48, the oil can be discharged to the sump chamber 40.

Figure 9:
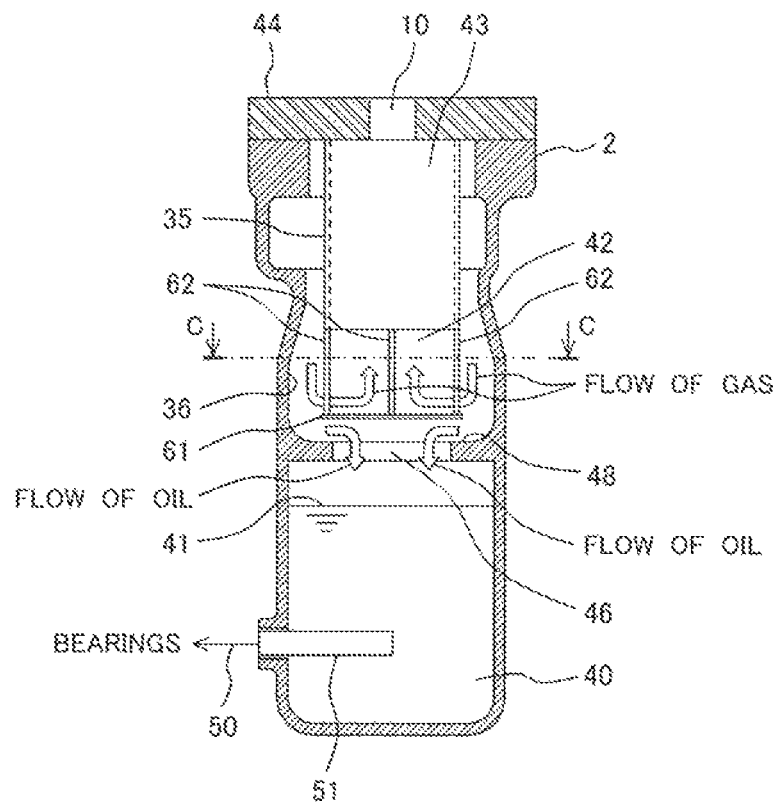
FIG. 9 is a longitudinal sectional view of a screw compressor.

FIG. 9 illustrates another embodiment of FIG. 3. As shown in FIG. 9, a circular partition plate 61 may be provided in the space between the inner cylinder 35 and the guide 48. (In other words, the space between the lower end portion of the inner cylinder and the oil drain hole.) By providing the partition plate between the flow of oil and the flow of gas, the flows of gas and oil can be divided. As a result, the space between the guide 48 and the partition plate 61 is filled with the flow of oil and thus the swirling flow of gas is less prone to enter the oil drain hole 46. Therefore, the oil surface 41 is stabilized and the oil surface position can be accurately grasped with a sight glass, an oil level gauge, or the like provided in the oil separator 2.

Figure 10:
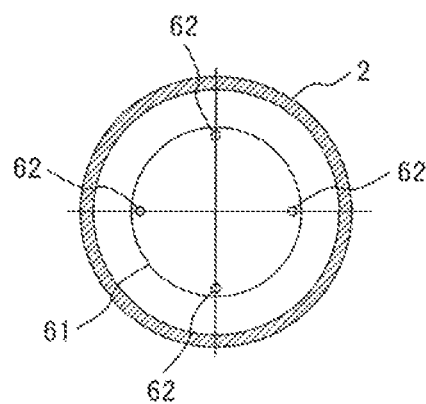
FIG. 10 is a sectional view taken along line C-C of FIG. 9 as viewed in the direction of arrows.

FIG. 10 is a sectional view taken along line C-C of FIG. 9 as viewed in the direction of arrows and explaining the internal configuration of an oil separator. As shown in FIG. 10, the partition plate 61 is secured and supported with a round bar 62 connected to the inner cylinder 35. It is advisable that the partition plate 61 should be provided with the center thereof agreeing with the center of the oil separator 2. Higher effect can be obtained when the outside diameter of the partition plate is larger than the diameter of the oil drain hole 46.

According to these embodiments, as described up to this point, it is possible to obtain a screw compressor in which size reduction can be achieved and the oil rate can be reduced and a chiller unit using the screw compressor.

REFERENCE SIGNS LIST

1 . . . compressor body
2 . . . oil separator
3 . . . condenser
4 . . . expansion valve
5 . . . evaporator
6 . . . motor casing
7 . . . main casing
8 . . . discharge casing
9 . . . suction port
10 . . . discharge port
11 . . . rotor
12 . . . stator
13, 14 . . . rolling bearing
15 . . . suction port
16 . . . male rotor
17 . . . bore
18 . . . rolling bearing
19 . . . ball bearing
20 . . . discharge port (radial direction)
21 . . . discharge port (axial direction)
22 . . . discharge chamber
23 . . . discharge flow path
24 . . . introducing flow path
25 . . . pipe (refrigerant pipe)
26 . . . end cover
27 . . . rotating shaft
28 . . . strainer
29 . . . suction chamber
30 . . . contraction of pass
31 . . . swirl flow path (guide portion)
32 . . . flow of gas (discharge jet)
33 . . . flow of gas (swirl flow)
34 . . . guide (perpendicular face)
35 . . . inner cylinder
36 . . . inner wall surface (oil separator)
37 . . . flow path (oil separator)
38 . . . guide
40 . . . sump chamber
41 . . . oil surface
42 . . . inverting chamber
43 . . . gas outlet flow path (interior of inner cylinder)
44 . . . top cover
50 . . . pipe (oil pipe)
61 . . . partition plate
62 . . . round bar

The invention claimed is:

1. A screw compressor comprising:
a male rotor and a female rotor whose rotating shafts are parallel to each other and which are rotated in engagement with each other, forming a compression working chamber; and
an oil separator into which refrigerant discharged from the compression working chamber flows and which separates the refrigerant into refrigerant gas and oil,
wherein the oil separator includes: an outer cylinder; an inner cylinder located inside the outer cylinder; and an introducing flow path letting refrigerant discharged from the compression working chamber flow in so that the refrigerant swirls to a circumferential direction on an inner wall surface of the outer cylinder,
wherein an upper end portion of the inner cylinder is held by the oil separator and an outer wall of the inner cylinder is thereby held independently of the inner wall of the outer cylinder,
wherein a diameter of an inner wall of the outer cylinder is so configured that the diameter is gradually reduced along a swirl flow path in which refrigerant that flowed in through the introducing flow path swirls,
wherein refrigerant that flowed in through introducing passage swirls and goes down along the swirl flow path which is the inner wall of the outer cylinder and is thereby separated into gas refrigerant and oil, thereafter the separated gas refrigerant flowing from a lower end portion of the inner cylinder into the inner cylinder and going up and the separated oil flowing down along the inner wall surface of the outer cylinder, and
wherein an outlet portion of the introducing flow path has a portion of a contraction of pass protruded from a center of the outer cylinder toward the inner wall of the outer cylinder.

2. A chiller unit formed by connecting the screw compressor according to claim 1, a condenser, an expansion valve, and an evaporator through a refrigerant pipe.

3. A screw compressor comprising:
a male rotor and a female rotor whose rotating shafts are parallel to each other and which are rotated in engagement with each other, forming a compression working chamber; and
an oil separator into which refrigerant discharged from the compression working chamber flows and which separates the refrigerant into refrigerant gas and oil,
wherein the oil separator includes: an outer cylinder; an inner cylinder located inside the outer cylinder; and an introducing flow path letting refrigerant discharged from the compression working chamber flow in so that the refrigerant swirls to a circumferential direction on an inner wall surface of the outer cylinder,
wherein an upper end portion of the inner cylinder is held by the oil separator and an outer wall of the inner cylinder is thereby held independently of the inner wall of the outer cylinder,
wherein a diameter of an inner wall of the outer cylinder is so configured that the diameter is gradually reduced along a swirl flow path in which refrigerant that flowed in through the introducing flow path swirls,
wherein refrigerant that flowed in through introducing passage swirls and goes down along the swirl flow path which is the inner wall of the outer cylinder and is thereby separated into gas refrigerant and oil, thereafter the separated gas refrigerant flowing from a lower end portion of the inner cylinder into the inner cylinder and going up and the separated oil flowing down along the inner wall surface of the outer cylinder, and wherein an inclined portion in which the diameter of the outer cylinder is increased as it goes downward from the swirl flow path is provided.

4. The screw compressor according to claim 3, wherein a guide going inward from the inner wall of the outer cylinder is provided below the lower end of the inner cylinder, and wherein the lower end portion of the inner cylinder is positioned between an upper end portion and a lower end portion of the inclined portion and the guide is positioned below the lower end portion of the inclined portion.

5. A chiller unit formed by connecting the screw compressor according to claim 3, a condenser, an expansion valve, and an evaporator through a refrigerant pipe.

6. A screw compressor comprising:

a male rotor and a female rotor whose rotating shafts are parallel to each other and which are rotated in engagement with each other, forming a compression working chamber; and an oil separator into which refrigerant discharged from the compression working chamber flows and which separates the refrigerant into refrigerant gas and oil, wherein the oil separator includes: an outer cylinder; an inner cylinder located inside the outer cylinder; and an introducing flow path letting refrigerant discharged from the compression working chamber flow in so that the refrigerant swirls to a circumferential direction on an inner wall surface of the outer cylinder, wherein an upper end portion of the inner cylinder is held by the oil separator and an outer wall of the inner cylinder is thereby held independently of the inner wall of the outer cylinder, wherein a diameter of an inner wall of the outer cylinder is so configured that the diameter is gradually reduced along a swirl flow path in which refrigerant that flowed in through the introducing flow path swirls, wherein refrigerant that flowed in through introducing passage swirls and goes down along the swirl flow path which is the inner wall of the outer cylinder and is thereby separated into gas refrigerant and oil, thereafter the separated gas refrigerant flowing from a lower end portion of the inner cylinder into the inner cylinder and going up and the separated oil flowing down along the inner wall surface of the outer cylinder, and wherein a guide going inward from the inner wall of the outer cylinder is provided below a lower end of the inner cylinder.

7. The screw compressor according to claim 6, wherein an oil drain hole is provided in a center of the guide.

8. The screw compressor according to claim 7, wherein a partition plate is provided between the lower end portion of the inner cylinder and the oil drain hole.

9. A chiller unit formed by connecting the screw compressor according to claim 6, a condenser, an expansion valve, and an evaporator through a refrigerant pipe.

* * * * *